United States Patent Office 3,412,067
Patented Nov. 19, 1968

3,412,067
CURABLE COMPOSITIONS
James J. Sanderson, Chester Springs, Del., assignor to E. I.
du Pont de Nemours and Company, Wilmington, Del.,
a corporation of Delaware
No Drawing. Filed Oct. 1, 1964, Ser. No. 400,952
20 Claims. (Cl. 260—47)

ABSTRACT OF THE DISCLOSURE

This application claims curable compositions consisting essentially of (A) units of a compound containing a plurality of cyclic radicals having the structural formula

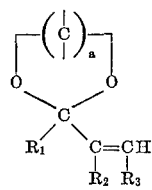

wherein:

represents carbon atoms in the ring, $a$ is an integer of 2 or 3; all but one of the valences of the carbon atoms are satisfied by a monovalent radical, the one remaining valence connecting the cyclic radical to at least one other such cyclic radical through an innocuous polyvalent chain radical having 4–8 carbon atoms in the connecting portion; $R_1$ and $R_3$ are H or $CH_3$ free radicals; and $R_2$ is a monovalent radical, and (B) units of a phenolic compound having at least three reactive sites per molecule in an amount of greater than 0.5 to about 1.7 equivalents per equivalent of the (A) compound. These compositions form, upon curing, solid infusible resins which are especially useful for electrical insulation and encapsulation.

This invention concerns curable compositions which form solid infusible resins having a unique combination of mechanical, electrical and chemical properties. These compositions are especially suitable for use in the electrical industry and generally suitable for use in a wide variety of other applications.

Resins which have been conventionally used for electrical insulation and encapsulation have been of the filled epoxy, filled polyester or filled phenol-formaldehyde type. More recently, curable compositions comprising a spiro compound such as diallylidene pentaerythritol and a phenolic compound have been developed for these electrical applications. Difficulties encountered in using these spiro-containing compounds are due to their rapid rates of cure which render them inconvenient and sometimes ineffective for impregnation and encapsulation processes.

A curable composition has now been discovered which has a slower, more useful curing rate over a broad temperature range including the elevated temperatures especially conductive to efficient impregnation. This slower curing rate results in a pot life several times longer than compositions presently used for similar applications.

This curable composition consists essentially of (A) units of a compound containing a plurality of cyclic radicals having the structural formula

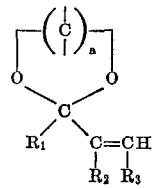

in which

represents carbon atoms in the ring, $a$ is an integer having a value of 2 or 3, all but one of the valences of said carbon atom being satisfied by monovalent radicals of hydrogen, alkyl, alkenyl, aryl, alkaryl, aralkyl, chloroalkyl, fluoroalkyl, alkoxyalkyl, fluoro, chloro, cyano, chloroalkoxyalkyl, fluoroalkoxyalkyl, cyanoalkoxyalkyl, cyanoalkyl, phenylsulfonyl, chloroaryl and fluoroaryl, the one remaining valence connects the cyclic radical to at least one other such cyclic radical through an innocuous polyvalent chain radical having from 4 to 18 atoms in the connective portion, $R_1$ and $R_3$ are H or $CH_3$ radicals, $R_2$ is a monovalent radical of hydrogen, alkyl, alkenyl, aryl, chloro, fluoro, bromo, cyano, acyloxy, chloroalkyl, fluoroalkyl, cyanoalkyl, alkoxy, aryloxy, or carbalkoxy, and (B) units of a phenolic compound having at least 3 reactive sites per molecule in an amount of greater than 0.5 to about 1.7 equivalents per equivalent of (A) compound.

Resins produced by curing the compositions of this invention have an excellent balance of properties including good thermal shock resistance, good resistance to various chemicals, high dielectric strength and high insulation resistance.

In the electrical field, the solid resins produced by curing the compositions of this invention are especially useful as encapsulating materials in the manufacture of resistors and insulators and as impregnating materials for use as interlayers in capacitors. The toughness, chemical inertness and machineability of the resins plus numerous other desirable properties renders these curable compositions useful in the chemical and mechanical fields as well.

When curing the compositions of this invention, a small amount of an acidic catalyst is required. The compositions can be prepared and cured by either of two methods. In the conventional method, the curable compounds are mixed with the acidic catalyst and the mixture is heated to initiate and propagate the curing reaction. The reaction will proceed to completion to form a solid infusible product, but the mixture will remain sufficiently liquid for at least one hour at the maximum recommended curing temperature of 180° C. and for several hours at lower temperatures to allow molding, impregnating, etc.

An alternate method of preparing and using these compositions is to initiate the reaction and then stabilize the mixture by neutralizing the acidic catalyst with a basic material. The resulting liquid has good storage life and handling properties and is easily reactivated at the time of use by adding additional catalyst. In those situations where the (B) phenolic compound is insoluble in the (A) compound, such as when bisphenol A is used as the (B) phenolic compound and o-phthalate diester of 2-vinyl-4-(4'-butanol)-1,3-dioxolane is used as the (A) compound, the earliest point at which the neutralizer can be added to obtain a homogeneous liquid is when the reaction has proceeded sufficiently to dissolve the phenolic compound. This alternate method is especially useful where this solubility situation occurs and also where the initial portion of the curing reaction is highly exothermic.

The length of time which the catalyzed compositions of this invention remain sufficiently liquid to allow pouring, impregnating or other operations at the elevated curing temperatures is called the pot life of the composition. The pot life of the compositions of this invention is generally about 10 to 20 times longer than the curable compositions of the prior art. This property is especially important when the composition is used for impregnation of a substrate such as kraft paper or polyester sheets. Substrates impregnated with these cured resins have excellent dielectric strength and dissipation factors and are extremely useful as capacitor interlayers. The excellent pot life of the compositions of this invention allows impregnation to be carried out by means of repeated cycles of vacuum and pressure at elevated temperatures thereby greatly increasing the efficiency of the operation. Extended pot life is also extremely useful when filling a complicated mold or encapsulating a complicated shape such as the windings of electrical motors and generators.

Metal wires and other products encapsulated by the cured compositions of this invention have excellent seals between the metal and the cured resin. These excellent seals are obtained with the ordinary metals and alloys, including iron, steel, aluminum, copper, tin-lead solder and Nichrome. Fillers such as silica, clay, talc, quartz, mica, glass, barytes, asbestos and cellulosic fibers can be added to these compositions to make them especially useful for encasing complete windings of electric motors and generators whereby a high degree of heat dissipation is provided. These compositions can be cast into films and are easily machined or sliced.

The (A) compounds of the curable compositions of this invention are described along with methods of preparation in U.S. Patents 3,010,918 and 3,010,923 the disclosures of which are hereby incorporated into this specification. As previously disclosed, these (A) compounds are essentially cyclic rings connected to each other by polyvalent chain radicals. (A) compounds having two such rings connected by a divalent chain are preferred in the compositions of this invention because the best cured resins result therefrom.

Connective portions of these chain radicals are those portions which directly connect any two rings. As previously disclosed, these connective portions of the (A) compounds of this invention are from 4 to 18 atoms long, but side chains having from one to eight atoms each can be attached to the connective portion at any atom. These chain radicals are preferably made up of carbon atoms and oxygen atoms. Sulfur atoms and nitrogen atoms in the form of an amide can also be used but the connective radicals must be innocuous to other components used in producing the final cured resins and therefore nitrogen atoms in the form of amino groups should be avoided or used only in shielded positions where their basic character will not neutralize the acidic catalyst used in the curing reaction. Metallic elements, for example, titanium, aluminum and boron, can be included in the chain. Cured resins having the best combination of electrical, mechanical, and chemical properties result from (A) compounds which contain chains made up of the preferred carbon atoms and oxygen atoms.

Monovalent radicals which can be used to satisfy those valences of the

atoms in the rings of the (A) compounds which are not satisfied by the connective chain radical include methyl, ethyl, propyl, butyl, octyl, phenyl, chloromethyl, fluoromethyl, chloroethyl, fluoroethyl, hydroxymethyl, tolyl, beta-chloroethyl, beta-chloroethoxyethyl, tri-fluorobutyl, beta-fluoroethoxyethyl, beta-cyanoethoxyethyl, and decenyl radicals. Best cured resin properties are obtained when these valences are satisfied by hydrogen atoms or monovalent radicals of less than 2 atoms in length but useful resins are obtained with monovalent radicals over 10 atoms in length substituted on the

atoms.

Examples of radicals which can be used as the $R_2$ radicals of these (A) compounds in addition to those already disclosed are methyl, ethyl, propyl, butyl, acetoxy, butyroxy, benzoyl, chloromethyl, chloroethyl, fluoroethyl, cyanoethyl, methoxy, butoxy, carbomethoxy, and carboethoxy radicals.

(A) compounds having a molecular weight below about 600 are preferred because they combine with the (B) compounds of this invention to produce cured resins having the best combination of mechanical, electrical, and chemical properties.

The connective radicals of these (A) compounds can be wholly aliphatic such as a butyl or octadecyl radical of a primary, secondary, or tertiary nature, or combinations of aliphatic groups and cyclic groups such as in the o-phthalate diester of 2-vinyl-4-(4'-butanol)-1,3-dioxolane. Cyclic groups useable in the chain can be alicyclic compounds such as cyclohexane, cyclopentane, or cyclohexene, or heterocyclic compounds such as a dioxolane, or aromatic groups such as the benzene ring contained in the o-phthalate compound above. Only the shortest route of connection is used in calculating the number of atoms in the connective portion of the chain when cyclic structures are present.

Connective portions of these chain radicals can contain various functional groups, including double bond carbon atoms, ester groups such as the diester of 2-vinyl-4-(4'-butanol) - 1,3 - dioxolane and fumeric acid, ether groups, ketone groups, etc. As previously disclosed, chain radicals must be innocuous to other components used in preparing the cured resins and therefore functional groups of a basic nature such as the amino group should be avoided or used in shielded positions. Side chains can contain alcohol and aldehyde groups as well as the functional groups useable in the connective portion. Typical useful connective radicals are disclosed in U.S. Patents 3,010,918 and 3,010,923.

The best combination of mechanical and electrical properties is obtained with preferred divalent chain radicals having from 12 to 15 atoms in the connective portion and which contain ester or ether groups. Ortho-phthalate, itaconate and fumarate diesters of 2-vinyl-4-(4'-butanol)-1,3-dioxolane have an especially useful balance of properties. Use of (A) compounds having divalent chain radicals of at least 14 atoms in the compositions of this invention produce cured resins capable of passing the impact test described in Government Specification MIL-I-16923D using two pound balls. In this test, a 2" x 2" x ½" thick sample of a test resin is placed on a 1" thick steel backing plate and steel balls of successively larger size are dropped on the sample from a height of 3 feet. The heaviest ball which does not break the resin sample is referred to as a measure of the resin's toughness.

In the curing reactions of the compositions of this invention, the reactive portions of the (A) compounds are the vinyl radicals. Since there are two vinyl radicals per (A) molecule, an equivalent weight of the (A) compound for the reactions of this invention is the molecular weight divided by two.

The reactive sites of a phenolic compound for purposes of this invention are the unsubstituted positions which are ortho or para to the hydroxyl groups. Phenol itself has 3 reactive sites and is useful in forming the resins of this invention. The meta positions can be substituted with methyl groups to form m-cresol or 3,5-xylenol without reducing the number of reactive sites and these methyl substituted compounds are also useful in the resins of this invention. Other useful phenolic compounds are resorcinol, m-methyl-resorcinol, hydroquinone, methyl hydroquinone, bisphenol A and bisphenol A having as many as 4 methyl groups substituted at its meta positions, novolacs, 1-naphthol, 1-naphthol having up to 3 methyl groups substituted on the rings, 1,5-naphthalenediol and 1,5-naphthalenediol having as many as both two methyl groups substituted at either the "3" or "7" or both "3" and "7" positions, 1,4,5-naphthalenetriol and methyl substituted 1,4,5-naphthalenetriol, 1,4,5,8-naphthalenetetrol and methyl substituted 1,4,5,8-naphthalenetetrol, etc.

Resins having the best combination of mechanical, electrical, and chemical properties result when phenol, hydroquinone, resorcinol, 1-naphthol, 1,5-naphthalenediol, bisphenol A or novolac resins are used as the (B) compound.

Novolac resins useful in the curable compositions of this invention are generally straight chain condensation products of any of the above-mentioned phenolic materials with less than molar proportions of an aldehyde or ketone such as formaldehyde, acetaldehyde, butyraldehyde, acetone, etc. Novolac structure consists essentially of phenolic nuclei joined together by methylene links. Substitutions can be made on the phenolic rings or on the methylene links without affecting the usefulness of the novolacs in the curable compositions of this invention.

Equivalent weights of phenolic compounds useful in the curable compositions of this invention are determined by dividing molecular weight by the number of reactive sites. Equivalent weights of novolacs are equal to average molecular weight divided by the average number of reactive sites per molecule. Reactive sites of novolacs are the unsubstituted positions which are ortho or para to the phenolic hydroxyl groups. The average number of reactive sites per molecule of a novolac can be calculated according to the formula, $$R_{avg.} = \frac{(M+c-18)(f-2)}{p+c-18} + 2$$

where $R_{avg}$ is the average number of reactive sites per molecule of a novolac having an average molecular weight M, $p$ is the molecular weight of the phenolic component, $f$ is the number of reactive sites per molecule of the phenolic component and $c$ is the molecular weight of the carbonyl compound. For a novolac resin of phenol and formaldehyde, for example, where $p=94$, $f=3$, and $c=30$, this formula reduces so that equivalent weight of the phenol-formaldehyde resin can be calculated from the equation $$\text{Eq. weight} = \frac{106M}{M+224}$$

The solid resins of this invention which have the best combination of properties are those which contain from 0.8 to 1.1 equivalents of (B) phenolic compound per equivalent of (A) compound.

Acidic catalysts useful for curing the compositions of this invention are acids having pKa values of less than about one which are not reactive with the curable components, and compounds capable of producing these acids. Typical innocuous (non-reactive) acids coming within this definition and which are useful are inorganic acids such as sulfuric acid and pyrophosphoric acid, or strong organic acids such as benzenesulfonic acid, toluene sulphonic acid, naphthalene sulfonic acid, substituted benzene sulfonic acids such as methylbenzenesulfonic acid, ethylbenzenesulfonic acid, propylbenzenesulfonic acid, octylbenzenesulfonic acid, dodecylbenzenesulfonic acid, substituted toluenesulfonic acids, or substituted naphthalenesulfonic acids, etc. Compounds which release acids having pKa values of less than one upon heating, such as the alkyl esters of sulfonic acids and sulfuric acids (e.g. diethyl sulfate) are particularly useful catalysts because they can be incorporated in compositions which can be cured under commercially feasible conditions and yet have excellent room temperature stability. Sulfuric, benzenesulfonic, toluenesulfonic, and dodecylbenzenesulfonic acids are preferred acids because they are easily handled and readily available. Propylene sulfone, which produces sulfonic acid groups on reaction with hydroxy groups and strong Lewis acids having pKa values of less than about one, for example, mixtures of boron fluoride with weak acids such as phosphoric and oxalic acids, are also effective. Hydrochloric acid and nitric acid react with the curable compositions of this invention and are not useful as catalysts. The percentage of active (non-neutralized) acid can be as low as 0.01% of the total resin weight and still effectively catalyze the reaction. Curing is accelerated by increasing the amount of active (C) catalyst to the preferred range of 0.1 to 0.3% by weight based on total resin weight. Active catalyst quantities can be as high as 2% on this basis, but these higher proportions should be used only when the lower curing temperatures are used.

The pKa values of these acids referred to herein are negative logarithms of the dissociation constants of these acids and are measures of acid strength. Dissociation constants of these acids are measured at 25° C. by the conductometric method described by J. F. J. Dippy in Chemical Reviews 25; 151, 159 (1939).

Basic materials useful for stabilizing the reaction mixture when a stable liquid composition is desired are preferably tertiary aliphatic amines such as trimethylamine, triethylamine, tripropylamine, tributylamine, tripentylamine, trioctylamine, N-methyl-diethylamine, N-ethyl-dimethylamine, N - ethyl - N - methyl - propylamine, and N-ethyl-dipropylamine; tertiary aryl-aliphatic amines such as tribenzylamine and N-phenyl-benzylamine; combined aliphatic-aromatic amines such as N,N-dimethylaniline, N,N-diethylaniline, N,N-dipropylaniline, and N-ethyl - N - methyl - aniline; or aryl substituted aliphatic amines such as N,N - dimethylbenzylamine, N,N-diethylbenzylamine, N,N - dipropylbenzylamine, N,N-dibutylbenzylamine, N,N - dipentylbenzylamine, N,N-dioctylbenzylamine, N - ethyl - N - methyl - benzylamine, and N-propyl-N-butyl-benzylamine. The tertiary amines are preferred because they do not cause water sensitivity and are less likely to impart a color to the resin or to participate in side reactions but secondary and primary amines and other organic and inorganic bases and basic salts, for example, calcium or barium carbonates, etc. can also be used. The amount of basic material which is added should be sufficient to stoichiometrically neutralize the acidic catalyst.

Heating of the components is necessary to produce a solid resin having the desirable balance of properties previously described. Good resins are obtained by using curing cycles of 12 hours at 80° C. to 2 hours at 180° C. Longer periods of time at temperatures lower than 80° C. along with increased amounts of catalyst or weaker acidic catalysts and temperatures higher than 180° C. can be used to suit unusual requirements. A preferred curing cycle of about 5 to 7 hours at about 140° C. to 160° C. with a catalyst percentage of 0.1% to 0.3% based on total resin weight produces cured resins with an excellent combination of properties. The compositions of this invention cure without the formation of gases or fumes when used according to these heating cycles and catalyst percentages.

Cured resins of this invention are normally transparent and amber-colored. Opacity and additional coloring can be imparted by adding pigments which are slightly acidic or neutral such as the sulfates, chlorides, and phosphates. Amphoteric or basic pigments should not be used because they tend to neutralize the curing catalyst.

The following examples illustrate the preparation and use of resins of this invention.

Example 1

125 pounds of o-phthalate diester of 2-vinyl-4-(4'-butanol)-1,3-dioxolane prepared according to Example 6 of U.S. Patent 3,010,923 is charged to a stainless steel reactor vessel, heated to 100° C. with stirring and held at that temperature for one hour at 10 millimeters of absolute pressure to remove volatiles. Stirring is continued throughout the process. The diester is quickly cooled to 40° C., the vacuum broken with nitrogen and 40 pounds of flake bisphenol A (4,4'-isopropylidene diphenol) and a solution of 0.075 pound of dodecylbenzenesulfonic acid in 6 pounds of o-phthalate diester of 2-vinyl-4-(4'-butanol)-1,3-dioxolane are added.

The resulting mixture is heated to 110° C. and held at this temperature for about 15 minutes, at which point the reaction has proceeded sufficiently to dissolve the bisphenol A. A solution of 0.037 pound of N,N-dimethylbenzylamine in 5 pounds of o-phthalate diester of 2-vinyl-4-(4'-butanol)-1,3-dioxolane is then added. The resulting product is a stable transparent amber liquid resin having a Gardner-Holdt viscosity of about Z-3⅓.

Three hundred sixty grams of the above liquid resin are activated by mixing in a solution of 0.8 gram of dodecylbenzenesulfonic acid in 40 grams of o-phthalate diester of 2-vinyl-4-(4'-butanol)-1,3-dioxolane. The resulting proportion of equivalents of (B) phenolic compound to (A) compound is 1.05:1. Molds containing iron and steel nails, aluminum strips and fine Nichrome wires as simulated electrodes are filled with the activated liquid resin and cured for 5 hours at 150° C.

Excellent seals between the solid transparent, amber-colored resin and the metal electrodes result. The encapsulated portions of the electrodes are protected by the resin and no wicking along the interfaces between resin and metal occurs when samples are subjected to 100% relative humidity and salt spray tests for one month. Cured resin samples 2" x 2" x ½" thick passed the impact test of MIL-I-16923 using 2 pound balls. Other mechanical, electrical and chemical properties including the pot life of the composition of this example are summarized in Table I.

Example 2

A 90 gram portion of the stabilized liquid resin prepared in Example 1 is activated by mixing with a solution of 0.3 gram of diethyl sulfate in 10 grams of o-phthalate diester of 2-vinyl-4-(4'-butanol)-1,3-dioxolane. Two hundred grams of dried silica are also admixed and the resulting mixture cured for five hours at 150° C. A hard, light gray composition having mechanical, chemical and electrical properties similar to the cured resin of Example 1 was obtained. The pot life of the composition of this example is equal to the pot life of Example 1 compositions.

Example 3

Another 90 gram portion of the stabilized liquid prepared in Example 1 is activated with a solution of 0.1 gram of diethyl sulfate in 10 grams of o-phthalate diester of 2-vinyl-4-(4'-butanol)-1,3-dioxolane. The liquid is warmed and poured into a heated mold prepared from two release-agent coated 5" x 7" glass plates separated by ⅛" polytetrafluoroethylene spacers. After curing for 5 hours at 150° C., a light yellow sheet having excellent clarity is obtained. The sheet had a moisture absorption of 0.72% at 95% relative humidity and a water vapor permeability of $16.2 \times 10^{-7}$ grams/hour/cm. These values are within the limits established by Government Specification MIL-I-16923D for an Insulating Compound, Electrical, Embedding. Pot life of this composition is equal to Example 1 compositions.

A cylindrical sample 1¾ inches in diameter is also prepared from this Example 3 liquid resin and a disk 50 mils thick is cut from this cylinder. Foil electrodes are applied to the faces of the disk with a small amount of petroleum jelly. Excellent electrical dissipation factors of 0.026, 0.009, and 0.014 are obtained at frequencies of 100, 1,000 and 100,000 cycles per second respectively. Very good values of 0.042, 0.046, .044, and 0.047 are obtained at 1,000 cycles per second at elevated temperatures of 90° C., 150° C., 130° C., and 155° C., respectively. Dielectric constants at room temperature range from 4.0 to 4.4. These electrical properties are within the limits prescribed by Government Specification MIL-I-16923D for resin types B, C, and D. These Example 3 resins also passed the impact test prescribed by this Government Specification through the 2 pound ball.

Example 4

A novolac resin having an equivalent weight approximately equal to the equivalent weight of bisphenol A is substituted for bisphenol A in the method of preparation of Example 1. The resulting stabilized liquid composition is cured as in Example 1 to form a solid resin having the properties shown in Table I. This cured resin passed the impact test prescribed by Government Specification MIL-16923D through the 4 pound ball.

The following table illustrates the properties obtained with the resins of this invention produced according to Examples 1 and 4 and compares these properties with a conventional filled epoxy type resin. The requirements of Government Specification MIL-I-16923D for an Insulating Compound, Electrical, Embedding, are also shown where applicable.

TABLE I.—PROPERTIES OF CURED RESINS OF EXAMPLES 1 AND 4 vs. A CONVENTIONAL FILLED EPOXY RESIN

| Property | Filled Epoxy Type Resin | Example 1 Cured Resin | Example 4 Cured Resin |
| --- | --- | --- | --- |
| Water Resistance (wt. increase, 24 hrs.) percent | 0.15 | 0.2 | 0.3 |
| Water vapor permeability [1] | | $1.59 \times 10^{-6}$ g./cm./hr. | $1.59 \times 10^{-6}$ g./cm./hr. |
| Resistance to hot transformer oil (wt. increase after 6 hrs., 150° C.) percent | 2.4 | 0.2 | 0.1 |
| Resistance to thermal shock | Excellent | Excellent | Excellent |
| Thermal stability (wt. loss after 1,250 hrs. at 150° C.) percent | 5.9 | 7.9 | 3.8 |
| Dielectric strength (volts/mil at 18 mil thickness) | 750 | 1,000 | 1,000 |
| Dissipation factors at 77° F. and 1,000 cps.[1] | 0.065–0.08 | 0.01–0.015 | 0.01–0.015 |
| At 250° F. and 1,000 cps | 0.062 | 0.046 to 0.076 | 0.07 to 0.08 |
| Viscosity of stabilized liquid: | | | |
| 25° C | | 33 poise | 68 poise |
| 80° C | 300 poise | | |
| 95° C | 5.5 poise | 0.65 poise | 0.80 poise |
| Hardness after curing | 2 Knoop | 4–8 Knoop | 4–8 Knoop |
| Curing temperature | 3 hrs.×120° C. or 8 hrs.×95° C | 5 hrs.×150° C | 5 hrs.×150° C. |
| Coefficient of linear expansion, length/unit length/° C.[1] | | $13.8 \times 10^{-5}$ | $14.2 \times 10^{-5}$ |
| Clarity | Opaque | Clear yellow | Clear amber. |
| Pot life (catalyzed): | | | |
| 25° C | 3–4 days | Several weeks | Several weeks. |
| 120° C | 30 minutes | 3–4 hours | 3–4 hours. |
| 150° C | 5–10 minutes | 1.5 hours | 1.5 hours. |

[1] Government Specification MIL-I-16923 D, Type B (General Purpose) maximum allowable water vapor permeability is $20 \times 10^{-6}$ g./cm./hr.; maximum dissipation factor at 77° F. and 1,000 cps. is 0.03; maximum coefficient of linear expansion is $30 \times 30^{-5}$ length/unit length/° C.

The following tables show various properties of several resins of this invention and mixtures thereof. These resins were prepared according to the procedure of Example 1. Each of the (A) compounds is the indicated diester of di-2-vinyl-4-(4′-butanol)-1,3-dioxolane.

TABLE II
[Dissipation Factors at 77° F.]

| (A) Compound | (B) phenolic compound | Equivalents of (B) per equivalent of (A) | Dissipation Factor 1 kc. | Dissipation Factor 100 kc. |
|---|---|---|---|---|
| Fumarate diester | Bisphenol A | 1.05 | .008 | .011 |
| o-Phthalate diester | do | 1.05 | .011 | .013 |
| | Mixture: | | | |
| Do | do | 1.05, 9 parts | } .011 | .013 |
| Do | 1,5-naphthalenediol | 1.05, 1 part | | |
| Do | Bisphenol A | 1.05, 9 parts | } .012 | .013 |
| Do | 1,5 hydroquinone | 1.33, 1 part | | |
| Itaconate diester | Bisphenol A | 1.05 | .056 | .025 |
| Filled epoxy type resin | | | .080 | .066 |
| Government Specification MIL-I-16923D Type B General Purpose | | | 0.03 max | |

TABLE III.—DIELECTRIC BREAKDOWN STRENGTH OF FILMS

| (A) Compound | (B) Phenolic compound | Equivalents of (B) per equivalent of (A) | Breakdown voltage Thickness, Mils | Breakdown voltage Average, Volts/Mil |
|---|---|---|---|---|
| o-Phthalate diester | 1,5 naphthalenediol | 1.00 | 9–10 | 1,470 |
| Do | p-Phenylphenol-phenolformaldehyde novolac | 1.00 | 14.5–16 | 1,260 |
| Do | Resorcinol | 1.33 | 15–16 | 990 |
| Do | Bisphenol A | 1.05 | 125 | [1] 372 |
| Do | Phenol-formaldehyde novolac (molecular weight of 232) | 1.06 | 125 | [1] 352 |

[1] Government Specification MIL-I-16923D Type B General Purpose minimum breakdown voltage for ⅛″ thick (125 mil) sheet is 325 volts/mil.

TABLE IV.—PERCENT WEIGHT GAIN ON EXPOSURE TO VARIOUS LIQUIDS

| (A) Compound | (B) Phenolic Compound | Equivalents of (B) per equivalent of (A) | Percent weight gain Transformer oil 30 min. at 130° C. plus 6 hrs. at 100° C. | Percent weight gain Water 24 hours at 25° C. | Percent weight gain Toluene 7 hours at 25 C. |
|---|---|---|---|---|---|
| Fumarate diester | Phenol-formaldehyde novolac (M.W. of 232) | 1.00 | 0.00 | 0.28% | 1.36% |
| Do | 1,5 naphthalenediol | 1.00 | 0.16% | 0.31 | 3.07 |
| o-Phthalate diester | Bisphenol A | 1.00 | 0.18 | 0.20 | 7.86 |
| Do | 1,5 naphthalenediol | 1.00 | 0.18 | 0.23 | 3.43 |
| Fumarate diester | Bisphenol A | 1.00 | 0.35 | 0.22 | 7.48 |
| Filled epoxy type resin | | | 2.38 | 0.13 | 17.5 |

What is claimed is:

1. A curable composition consisting essentially of (A) units of a compound containing a plurality of cyclic radicals having the structural formula

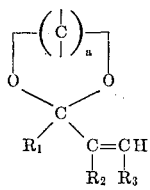

in which

represents carbon atoms in the ring, $a$ is an integer having a value of 2 to 3, all but one of the valences of said carbon atoms being satisfied by monovalent radicals of the group consisting of hydrogen, alkyl, alkenyl, aryl, alkaryl, aralkyl, chloroalkyl, fluoroalkyl, alkoxyalkyl, fluoro, chloro, cyano, chloroalkoxyalkyl, fluoroalkoxyalkyl, cyanoalkoxyalkyl, cyanoalkyl, phenylsulfonyl, chloroaryl, and fluoroaryl, the one remaining valence connects the cyclic radical to at least one other such cyclic radical through an innocuous polyvalent chain radical having from 4 to 18 atoms in the connective portion, $R_1$ and $R_3$ are monovalent radicals selected from the group consisting of H and $CH_3$, $R_2$ is a monovalent radical selected from the the group consisting of hydrogen, alkyl, alkenyl, aryl, chloro, fluoro, bromo, cyano, acyloxy, chloroalkyl, fluoroalkyl, cyanoalkyl, alkoxy, aryloxy, and carbalkoxy, and (B) units of a phenolic compound having at least 3 reactive sites per molecule in an amount greater than 0.5 to about 1.7 equivalents per equivalent of (A) compound.

2. The composition of claim 1 in which the chain radical is divalent.

3. The composition of claim 2 in which the connective portion of the chain radical contains from 12 to 15 atoms.

4. The composition of claim 3 in which the connective portion of the chain radical comprises an ester group.

5. The composition of claim 4 in which the (A) compound is the o-phthalate diester of 2-vinyl-4-(4′-butanol)-1,3-dioxolane.

6. The composition of claim 5 in which the (B) compounds is selected from the group consisting of phenol, hydroquinone, resorcinol, 1-naphthol, 1,5-naphthalenediol, bisphenol A, and novolac resins.

7. The composition of claim 6 in which the (B) compound is bisphenol A.

8. The composition of claim 7 which contains from 0.8 to 1.1 equivalents of (B) compound per equivalent of (A) compound.

9. A curable homogeneous liquid comprising the composition of claim 8 and a compound selected from the group consisting of neutralized innocuous acids having a pKa value of less than about one, and compounds capable of producing said acids.

10. The liquid of claim 9 in which the neutralized acid is the salt of an acid selected from the group consisting of sulfuric acid, toluene sulfonic acid, benzenesulfonic acid, and dodecylbenzenesulfonic acid, and a tertiary aryl substituted aliphatic amine.

11. The liquid of claim 10 in which the amine is N,N-dimethyl benzylamine.

12. A solid resin comprising the cured liquid of claim 11 and an acid catalyst in an amount of about 0.01% to about 2% by weight based on total resin weight.

13. The solid resin of claim 12 in which the amount of the catalyst is from 0.1% to 0.3% by weight based on total resin weight.

14. The solid resin of claim 12 in which the acidic catalyst is selected from the group consisting of sulfuric acid, toluene sulfonic acid, benzenesulfonic acid and dodecylbenzenesulfonic acid.

15. A curable homogeneous liquid comprising the composition of claim 1 and a compound selected from the group consisting of neutralized innocuous acids having a pKa value of less than about one, and compounds capable of producing said acids.

16. The liquid of claim 15 in which the neutralized acid is the salt of an acid selected from the group consisting of sulfuric acid, toluene sulfuric acid, benzenesulfonic acid, dodecylbenzenesulfonic acid, and a tertiary aryl substituted aliphatic amine.

17. The liquid of claim 16 in which the tertiary aliphatic aromatic amine is N,N-dimethyl benzylamine.

18. The curable composition of claim 1 in which the (B) compound is selected from the group consisting of phenol, hydroquinone, resorcinol, 1-naphthol, 1,5-naphthalenediol, bisphenol A and novolac resins.

19. The curable composition of claim 1 which contains from 0.8 to 1.1 equivalents of (B) compound per equivalent of (A) compound.

20. A solid resin comprising the curable composition of claim 1 and an acidic catalyst in an amount of about 0.01% to about 2% by weight based on total resin weight.

References Cited

UNITED STATES PATENTS

| | | | |
|---|---|---|---|
| 2,915,492 | 12/1959 | Wilson et al. | 260—844 |
| 2,915,498 | 12/1959 | Kreft | 260—47 |
| 2,915,499 | 12/1959 | Wilson et al. | 260—47 |
| 2,915,500 | 12/1959 | Wilson et al. | 260—47 |
| 2,915,501 | 12/1959 | Guest et al. | 260—47 |
| 3,010,918 | 11/1961 | Ikeda | 260—23.5 |
| 3,010,923 | 11/1961 | Ikeda | 260—23 |
| 3,058,933 | 10/1962 | Ikeda | 260—23 |
| 3,058,934 | 10/1962 | Ikeda | 260—22 |

JOSEPH L. SCHOFER, *Primary Examiner.*

M. B. KURTZMAN, *Assistant Examiner.*